No. 864,441. PATENTED AUG. 27, 1907.
J. B. WRIGHT.
AIR BRAKE.
APPLICATION FILED MAR. 3, 1906.

2 SHEETS—SHEET 1.

WITNESSES: John B. Wright INVENTOR

By C. A. Snow & Co.

ATTORNEYS

No. 864,441. PATENTED AUG. 27, 1907.
J. B. WRIGHT.
AIR BRAKE.
APPLICATION FILED MAR. 3, 1906.
2 SHEETS—SHEET 2.
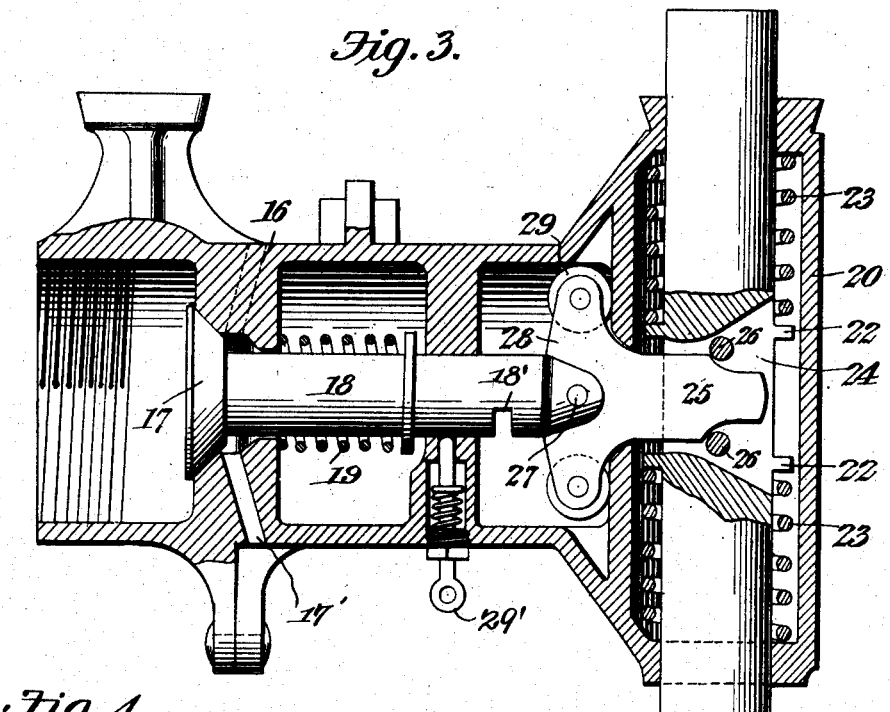
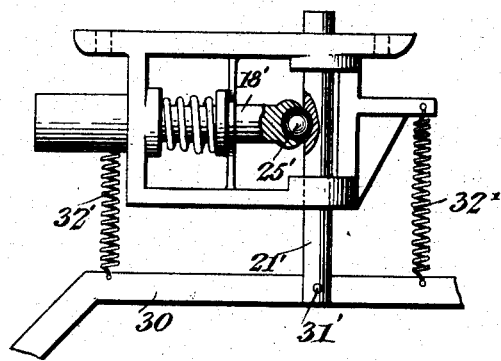
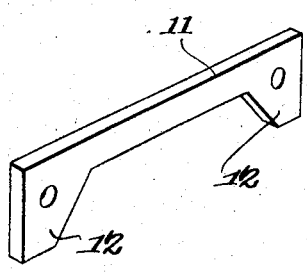
WITNESSES:
John B. Wright INVENTOR
ATTORNEYS

UNITED STATES PATENT OFFICE.

JOHN BUNYAN WRIGHT, OF GREENSBORO, NORTH CAROLINA.

AIR-BRAKE.

No. 864,441.        Specification of Letters Patent.        Patented Aug. 27, 1907.

Application filed March 3, 1906. Serial No. 304,117.

*To all whom it may concern:*

Be it known that I, JOHN BUNYAN WRIGHT, a citizen of the United States, residing at Greensboro, in the county of Guilford and State of North Carolina, have invented a new and useful Air-Brake, of which the following is a specification.

This invention relates to mechanism for automatically operating air brakes, and has for its principal object to provide a device of very simple construction by which the air brakes may be instantly applied in the event of any abnormal position of one of the trucks on the train, such, for instance, as the jumping of a track, or the turning of the truck beyond a normal curve, as in case one truck should remain on the line, while another truck of the same car attempts to pass on to a switch or siding.

A further object of the invention is to provide a brake applying mechanism adjacent to the center of each truck, where it cannot be set into operation through the ordinary swaying of the car bodies.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
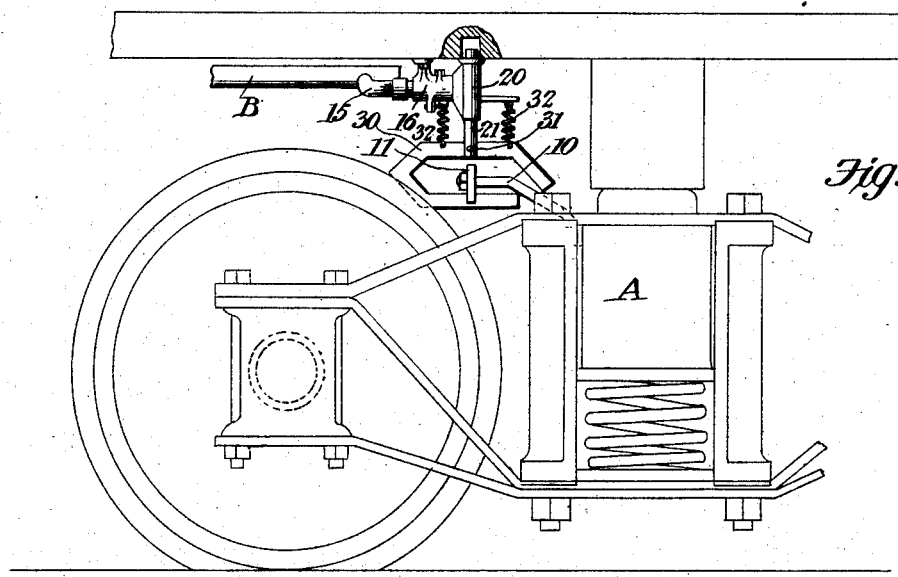
Figure 2:
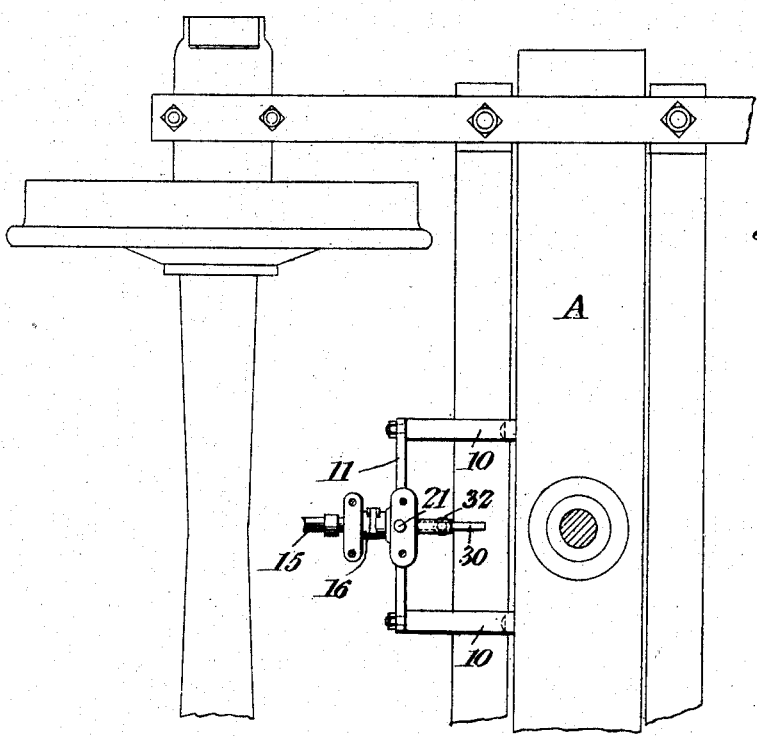

In the accompanying drawings:—Figure 1 is a sectional elevation of a brake applying mechanism constructed in accordance with the invention. Fig. 2 is a plan view of the same. Fig. 3 is an enlarged detail view of the valve which is automatically opened to reduce the train pipe pressure. Fig. 4 is a detail view, illustrating a slight modification of the invention. Fig. 5 is a detail perspective view of the operating bar carried by the truck bolster.

Similar numerals of reference are employed to indicate corresponding parts throughout the several figures of the drawings.

Each of the truck bolsters A is provided with a pair of spaced arms 10, extending horizontally to the front or to the rear of the bolster, said arms being arranged equal distances from the center of the king pin. To the outer ends of the arms is secured a bar 11 that is disposed parallel with the truck bolster A, said bar being provided with abutment or cam-shaped end portions 12 which are of service in operating the device where the truck turns to an abnormal extent.

The train pipe B is arranged in the usual manner, and in addition to its ordinary connections, is provided with a branch pipe 15 at the end of which is a valve chamber 16. The valve chamber has a seat for a valve 17 that is carried by a stem 18, and encircling the stem is a valve closing spring 19. From the inner face of the valve seat leads an exhaust pipe 17′.

The valve casing is provided with an extension 20 that forms a guide for a vertically movable rod 21 that is provided with a pair of spaced collars or flanges 22, and between these flanges and the ends of the extended portions of the casing are coiled compression springs 23 that tend to maintain the rod in a central position. This rod is provided with a vertically disposed slot 24 for the reception of the inner end of an arm 25 that is arranged to be engaged by a pair of pins 26, extending across the slot. The inner end of the arm 25 is pivotally connected by a pin 27 to the end of the valve stem, and projecting from the opposite sides of said arm are pivot ears 28 which carry antifriction rollers 29, the latter resting against one wall of the casing.

Under normal conditions the spring 19 will hold the valve closed, and by exerting endwise pressure on the stem 18, will force both of the rollers 29 into engagement with the wall of the casing, but should the rod 21 be moved in the direction of its length, one or other of the rollers 29 will constitute a fulcrum for the movement of arm 25, and longitudinal movement will be transmitted to the stem and the valve opened without regard to the direction in which the rod 21 is operated.

When the stem is pushed back a recess 18′ in the stem is engaged by a spring pressed locking pin 29′ and the valve is held in open position, allowing the train pipe pressure to reduce and apply the brakes.

The lower end of the rod 21 is provided with a slot for the reception of the upper bar of an angular link 30, said lever or link being pivoted to the rod by a pin 31, so that it may swing in a vertical plane, and normally the upper and lower arms of the lever or link remain in horizontal planes, and are maintained in this position by a pair of coiled tension springs 32, extending between the upper bar of the lever or link and fixed portion of the frame.

The lever or link 30 encircles the bar 11, but normally is out of engagement with said bar, the parts being spaced from each other to an extent sufficient to permit the ordinary movements of the car with respect to the truck without coming into contact with each other.

Should the truck leave the rails, or there be any undue vertical movement of the truck with respect to the car body, the bar 11 will strike against either the upper or the lower bar of the lever or link 30, and will cause either upward or downward movement of the rod 21, so that the arm 25 will be rocked and the valve 17 moved to open position, permitting the train pipe pressure to reduce, and thus allowing the brakes to operate.

In case the abnormal turning movement of the truck, the lower bar of the lever or link will come into engagement with one or other of the abutments or cams 12, and one of the springs 32 will yield, permitting tilting movement of the lever or link 30 until the rod 21 is moved and the brake applied.

In the construction shown in Fig. 4, the end of the valve stem 18' is provided with a ball 25' that enters a socket in the vertically movable rod 21'. In this case the rod is free to rotate, and as soon as rotated, or in the event of vertical movement in either direction, the ball 25' may be forced from its socket with sufficient force to move the valve stem inward and open the valve. In this case the cam shaped end portions 12 of the bar 11 may operate by engagement with the link 30 to turn the rod 21', while the endwise movement of said rod 21' is effected in the manner previously described.

I claim:—

1. In brake applying mechanism for railway cars, a bar supported by a truck and adjacent to the center of said truck, and a movable brake applying member supported by the car body and arranged to be engaged by said bar when the truck assumes an abnormal position.

2. In apparatus of the class described, a bar supported by the truck and having cam shaped end portions, a brake applying rod supported from the car body, and a link pivoted to the lower portion of the rod and encircling said bar, said link having inclined faces with which the cam shaped ends of the bar may engage on abnormal turning movement of the truck.

3. In apparatus of the class described, a bar supported by the truck and provided with cam shaped end portions, a bracket secured to the body of the car, a valve casing carried thereby, said valve casing having an extended portion, a rod guided by said extended portion, a link supported by the rod and embracing said bar, said rod having a vertically disposed slot, a valve, a spring operated valve stem carrying the same, an arm pivotally connected to said valve stem and having one end arranged to extend into the slot of the rod, and a pair of rollers supported by said arm and arranged to form fulcrums for the movement of the latter as the rod is moved in a direction of its length.

4. In apparatus of the class described, a valve casing, a train pipe opening valve arranged therein, a stem carrying said valve, a spring engaging the stem and holding the valve in closed position, an arm pivoted to the stem and provided with oppositely disposed pivot ears, rollers journaled in said pivot ears and bearing against a portion of the casing, a vertically movable rod having a slot for the reception of the end of the arm, pins extending across said slot and adapted to engage the arm, centering springs for the rod, and means for effecting endwise movement of said rod.

5. In apparatus of the class described, a valve casing, a train pipe opening valve arranged therein, a stem carrying said valve and provided with a recess, a spring tending to hold the valve in closed position, an arm pivoted to the stem, means operable through abnormal position of the truck for moving said arm and effecting opening of the valve, and a spring pressed pin arranged to enter the recess of the valve stem and maintain the valve in open position.

In testimony that I claim the foregoing as my own, I have hereto affixed my signature in the presence of two witnesses.

JOHN BUNYAN WRIGHT.

Witnesses:
W. O. STRATFORD,
J. H. JOHNSON.